United States Patent
Morad (10) Patent No.: US 9,958,931 B2
(45) Date of Patent: May 1, 2018

(54) TECHNIQUES FOR SELF-TUNING OF COMPUTING SYSTEMS

(71) Applicant: The Joan and Irwin Jacobs Technion-Cornell Institute, New York, NY (US)

(72) Inventor: Tomer Morad, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 0 days. days.

(21) Appl. No.: 15/439,217

(22) Filed: Feb. 22, 2017

(65) Prior Publication Data

US 2017/0242472 A1 Aug. 24, 2017

Related U.S. Application Data (60) Provisional application No. 62/298,191, filed on Feb. 22, 2016.

(51) Int. Cl.
*G06F 1/32* (2006.01)
*G06F 9/44* (2006.01)
*G06F 9/445* (2018.01)

(52) U.S. Cl.
CPC ............ *G06F 1/329* (2013.01); *G06F 1/3206* (2013.01); *G06F 9/44505* (2013.01); *Y02B 60/144* (2013.01)

(58) Field of Classification Search
CPC ..... G06F 1/329; G06F 1/3206; G06F 9/44505
See application file for complete search history.

(56) References Cited

U.S. PATENT DOCUMENTS

| | | | |
|---|---|---|---|
| 6,952,782 B2 | 10/2005 | Staiger | |
| 6,964,539 B2 | 11/2005 | Bradley et al. | |
| 7,499,908 B2 | 3/2009 | Elnaflar et al. | |
| 7,996,839 B2 | 8/2011 | Farkas et al. | |
| 8,607,243 B2 | 12/2013 | Kumar et al. | |
| 8,788,864 B2 * | 7/2014 | Kamath | G06F 1/3203 713/320 |
| 9,026,817 B2 * | 5/2015 | Min | G06F 1/324 713/300 |
| 2005/0154861 A1 | 7/2005 | Arimilli et al. | |

(Continued)

FOREIGN PATENT DOCUMENTS

WO 2014209370 A1 12/2014

OTHER PUBLICATIONS

The International Search Report and the Written Opinion for PCT/US2017/018844, ISA/RU, Moscow, Russia, dated May 11, 2017.

*Primary Examiner* — Stefan Stoynov
(74) *Attorney, Agent, or Firm* — M&B IP Analysts, LLC (57) ABSTRACT

A method for self-tuning a computing system is presented. The method comprises mapping a current workload of the computing system to at least one bucket; measuring a current operation metric representing a current operation of the computing system; determining, based on the current operation metric, at least one optimization scheme for each of the at least one bucket, wherein the at least one optimization scheme includes at least a list of system knobs having optimal values configured to adjust the operation of the computing device to meet at least one predefined target metric; and setting each of the system knobs listed in the at least one determined optimization scheme to its respective value.

39 Claims, 5 Drawing Sheets

(56) References Cited

U.S. PATENT DOCUMENTS

| | | | |
|---|---|---|---|
| 2012/0005505 A1* | 1/2012 | Tolia | G06F 1/206 713/320 |
| 2013/0080760 A1 | 3/2013 | Li et al. | |
| 2013/0081005 A1 | 3/2013 | Gounares et al. | |
| 2014/0181487 A1 | 6/2014 | Sasanka | |
| 2014/0359269 A1 | 12/2014 | Moen et al. | |
| 2015/0106811 A1 | 4/2015 | Holler et al. | |

* cited by examiner

FIG. 5

TECHNIQUES FOR SELF-TUNING OF COMPUTING SYSTEMS

CROSS-REFERENCE TO RELATED APPLICATIONS

This application claims the benefit of U.S. Provisional Application No. 62/298,191 filed on Feb. 22, 2016, the contents of which are hereby incorporated by reference.

TECHNICAL FIELD

The present disclosure generally relates to managing performance and energy efficiency of a computing server and multiple computing servers in a data center.

BACKGROUND

Operators of data centers seek ways to reduce operating expenses (opex) of their data centers and improve their performance. A data center typically includes many servers (among other computing systems/applications) designed to execute different applications. In most cases, servers are designed or tuned to perform well across many different types of applications. However, maintaining high server performance for every possible application cannot be performed by the currently available solutions. For example, current state-of-the-art methods for server tuning cannot dynamically adapt to two different applications executed by a server, and achieve highest performance in each of them.

Another challenge in managing computing systems in data centers is to manage the tradeoff between energy consumption for a unit of work and performance. That is, tuning a server to achieve higher performance typically would increase the energy consumption for a unit of work.

One of the major data center operation expenses is energy, consumed largely by servers and coolers. An important data center energy efficiency metric is the power usage effectiveness (PUE) rating. The PUE rating compares the total data center power consumption to the amount of power consumed by the IT equipment. The ideal PUE is 1.0. When computing the PUE, any device that consumes power in the data center is considered such as, e.g., lighting, cooling, and so on. A PUE rating of 2.0 means that, for each watt consumed by the servers, another watt is consumed by the data center infrastructure. Thus, it is desirable to reduce the power consumption of the servers, as such reduction would also reduce the power consumption of the infrastructure of the data center.

Several solutions have been proposed to reduce the power consumption of data centers. Some solutions relate to infrastructure of the data centers, while others deal with the hardware resources of servers or other devices in the data centers.

For example, low-power processors may be a simple solution to reduce power consumption. However, such processors pose performance limitations, and thus may not be a desirable solution. Memory controllers, adapters, disk drives, and other hardware peripheral devices account for a large fraction of the power consumption of a computer server, and cannot be neglected. CPUs and these peripheral devices employ power management features that help in reducing power consumption. However, each peripheral device is independently power-managed and is not optimized with respect to the executed application and/or operation of other peripheral devices.

A computing server typically includes various hardware, firmware, and software components. Some proposed solutions discussed in the related art include manually tuning certain parameters of a server's components to a set of benchmarks for energy, performance, or power capping. However, such a solution tends to suffer from high labor costs and suboptimal results.

Further, manual tuning of servers is a complex process for several reasons: the optimal settings of parameters may differ from one application to another; the optimal settings of parameters for an application may change from one hardware configuration to another; etc. In addition, the complexity of a tuning process results from the high number (typically 100's in today's systems) of tunable parameters that depend on each other.

Due to the complexity and the time required, manual tuning is performed by experts, if at all, only on a subset of applications, parameters, or hardware configurations, thereby achieving sub-optimal performance. Further, tuning needs to be performed on an on-going basis, thereby incurring additional labor costs.

Only suboptimal optimization can be achieved by manual tuning, as such tuning is not responsive to the current workload of the server. That is, a current workload may differ from the benchmarks, and the workload itself may exhibit different phases of execution requiring a different set of parameter values for each phase.

In sum, the existing solutions for the above-mentioned problems cannot adapt dynamically to changes in the application(s), process(es), and task(s) that are being performed.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for self-tuning a computing system. The method comprises mapping a current workload of the computing system to at least one bucket; measuring a current operation metric representing a current operation of the computing system; determining, based on the current operation metric, at least one optimization scheme for each of the at least one bucket, wherein the at least one optimization scheme includes at least a list of system knobs having optimal values configured to adjust the operation of the computing device to meet at least one predefined target metric; and setting each of the system knobs listed in the at least one determined optimization scheme to its respective value.

Some embodiments disclosed herein also include a computing system comprising: a processing circuitry; and a memory, the memory containing instructions that, when executed by the processing circuitry, configure the computing system to: map a current workload of the computing system to at least one bucket; measure a current operation metric representing a current operation of the computing system; determine, based on the current operation metric, at least one optimization scheme for each of the at least one bucket, wherein the at least one optimization scheme includes at least a list of system knobs having optimal values configured to adjust the operation of the computing device to meet at least one predefined target metric; and set each of the system knobs listed in the at least one determined optimization scheme to its respective value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, techniques for optimizing certain system metrics of a computing server are disclosed. In an embodiment, a target metric for a server to achieve is defined, for example, using a system administrator software or a management software. A target metric defines at least an optimization attribute, which may include, but is not limited to, performance, energy, power cap, power, network bandwidth (e.g., of a network card), or any combination thereof. Each optimization attribute can also set an optimization goal or a specific value. For example, the goal could be to maximize performance of a server, to maximize performance while the power of the server is capped at 250 Watts, or to minimize energy per committed instruction. Further, the various optimization attributes may be ordered in priority. In one embodiment, the defined target metric is improved by continuously measuring a workload running on a server and dynamically tuning system knobs for the measured workload. In another embodiment, the defined target metric is improved through static tuning, where the system knobs are turned to their optimal static settings for workload measured at a past time period (e.g., the last 60 minutes). The selection of optimal static settings can be performed using, for example, a voting mechanism.

System knobs (hereinafter: "knobs") include, but are not limited to, hardware configuration parameters, firmware configuration parameters, operating system (OS) configuration parameters, application configuration parameters, and any other parameter that can influence the behavior or metric of the system. A non-limiting list of knobs include parameters indicating whether to enable symmetric multithreading on CPUs, whether to enable CPU cache prefetchers, whether to use a specific version of CPU microcode, whether to limit the power states of a power management unit of a CPU, which 10 scheduler to use in the OS, which task scheduler to use in the OS, the OS scheduler time interval, task affinities, the hardware timer event interval, the maximum network packet size, the maximum threads a web server software can spawn, and so on.

Workloads include one or more applications or system processes, each with one or more threads, which are run on the server. The workload includes different types of workload metrics typically not related to a specific hardware resource. For example, workload metrics include the frequency of memory operations in each workload phase.

Figure 1:
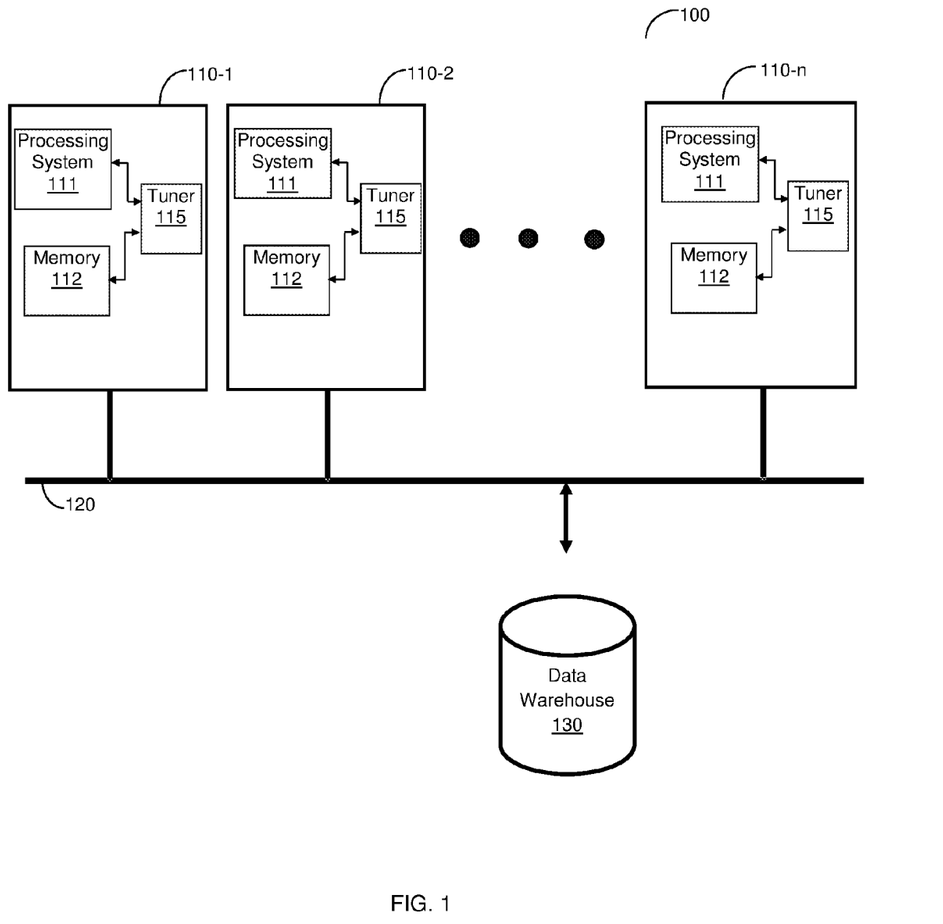
FIG. 1 is a diagram illustrating a data center utilized to describe the disclosed embodiments.

FIG. 1 shows an example schematic diagram of a data center 100 utilized to describe the disclosed various embodiments. As illustrated in FIG. 1, a plurality of computing servers 110-1 through 110-$n$ (hereinafter referred to collectively as servers 110 and individually as a server 110, merely for simplicity purposes) are communicatively connected to a network 120. In certain configurations, also connected to the data center 100 is a data warehouse 130 utilized to save metrics related to power consumption and performance, optimization schemes, configuration files, and so on.

A server 110 may be, for example, a web server, an application server, a media streaming server, a database server, a file server, a mail server, a print server, a gaming server, a batch server, and the like. A server 110 may host or execute one or more virtual machines or software containers (not shown). The network 120 may be a local area network (LAN), a wide area network (WAN), and the like. The data center 100 may be a cloud-computing platform, such as a public cloud, a private cloud, or a hybrid cloud.

Each server 110 typically includes a processing system 111 coupled to a memory 112. The processing system 111 may comprise or be a component of a processor (not shown) or an array of processors coupled to the memory 112. The one or more processors may be implemented with any combination of general-purpose microprocessors, multi-core processors, microcontrollers, digital signal processors (DSPs), field programmable gate array (FPGAs), programmable logic devices (PLDs), application specific integrated circuits (ASICs), controllers, state machines, gated logic, discrete hardware components, dedicated hardware finite state machines, or any other suitable entities that can perform calculations or other manipulations of information.

The processing system 111 may include machine-readable media for storing software. Software shall be construed broadly to mean instructions of any type, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 111 to perform the various functions described herein. The processing system 111 is also configured to execute any software application installed in a server 110.

According to the disclosed embodiment, each server 110 further includes a tuner 115 configured to perform the optimization techniques disclosed herein. Specifically, the tuner 115 is configured to dynamically tune one or more knobs as defined above to optimize the chosen target metric. To this end, the tuner 115 is configured to select an optimal optimization scheme for the current estimated workload of a server 110, and to apply the selected optimization scheme.

In an embodiment, the optimization scheme defines a set of knobs with a set of respective values. Applying the optimization scheme causes reconfiguration of one or more of the server 110 components (or resources) during the execution of programs. This allows for dynamic optimization of the target metric of the server 110 during runtime. It should be emphasized that different optimization schemes may be applied depending on the programs, applications, and/or processes currently executed by the server 110, as well as the execution phase of such applications. As noted above, a server 110 may include software, firmware, and hardware components.

In an embodiment, the determination of the current workload is based at least in part on the currently running applications, processes, or both, executed by the server 110. The workload is continuously monitored or otherwise estimated. To this end, the tuner 115 is configured to receive load data of performance counters from the processing system 111, the operating system, the peripherals, the executed applications, or a combination thereof. As an example, a performance counter provides the number of committed instructions in a core processor (of the processing system 111). As another example, a second performance counter provides the energy consumption of a CPU package. As yet another example, a third performance counter provides the number of off-chip memory requests. In one embodiment, target metrics are adjusted to account for environmental factors such as temperature, which can affect power consumption and performance.

The tuner 115 is configured to map the measured workload to buckets of similar workloads. In an embodiment, the mapping or classifying is performed using a locality based hashing function applied on workload-related values and history of such values. Examples for such values include, but are not limited to, a number of currently running threads and their executable names, and/or their command line parameters, the frequency of memory instructions out of the total instructions, and/or CPU usage of currently running threads. It should be noted that a number of workloads can be mapped to the same bucket. Further, as the workload is continuously monitored, the mapping to buckets can change as workloads change during execution. In another embodiment, classification is performed using boosted trees. In an embodiment, infrequently accessed buckets and optimization schemes are retired to reduce the memory footprint the tuner 115.

The tuner 115 is also configured to select an optimal optimization scheme for each bucket independently. In an embodiment, the selection is from a set of optimal optimization schemes determined to be optimal for a respective bucket. In another embodiment, buckets are classified to tuning groups, where each such group may include one or more buckets. For example, a tuning group may be defined as "the executable command line of the most dominant task." In another example, a tuning group may be defined as a community derived from clustering a directed graph, in which each vertex represents a bucket and each edge represents a transition between buckets with a weight that correlates to the number of transitions encountered. A tuning group can be utilized to capture macro program phases and apply the optimal scheme with respect to the group.

In both embodiments, when an optimal optimization scheme is not available, the tuner 115 is configured to tune various knobs until an improvement over the current state is detected, thereby establishing a new optimization scheme. The tuning process is an iterative process in which a set of knobs' values are set, and a target metric, which is measured, calculated, or a combination thereof, is either improved or reaches a goal. The measurement of the target metric can be performed during a predefined time interval. If the target metric goal is quantified and it is met, the iterative process ends. Alternatively, if a target metric goal is general and not quantified, the iterative process continues until a scheme with an acceptable target metric value is found.

In one embodiment, the tuner 115 is configured to perform a limited number of iterations and to choose the best knob configuration found. It should be noted that a set of knobs and their respective values that provide an improvement are set as an optimal optimization scheme for the bucket and/or respective tuning group. This iterative tuning process is discussed in greater detail herein below with respect to FIGS. 4 and 5.

An improvement is determined with respect to a target metric which may be based on one or more optimization attributes. An optimization attribute may include, but is not limited to, performance, power consumption, energy, power cap, network bandwidth, application-defined progress metric or any combination thereof. In an embodiment, a cap or a goal is determined for any optimization attribute in the target metric. Each optimization attribute may be associated with a specific goal (e.g., at least 1 B committed instructions per second for a performance optimization attribute). A goal may also comprise a range of values. In another embodiment, the target metric can be defined as an overall goal (e.g., to reduce the energy consumption per committed instruction). In this embodiment, each optimization attribute in the target metric is associated with an objective.

In an embodiment, energy can be measured using performance counters of hardware components, embedded or external power meters, or both. Energy measurements can be adjusted to factor other data center components, such as chillers and power distribution units. The average power can be estimated by the difference in energy measurements in a time interval divided by the time interval duration. Performance can be measured or otherwise estimated using conventional methods for determining performance in a computing server. For example, performance can be characterized by a number of retired instructions per second, by software-generated progress cues (e.g., a number of web requests served), and so on.

According to some embodiments, when an optimization attribute of the target metric is a power cap, the optimization attribute can be set with a specific value equal to the power budget constraint. In this case, the tuner 115 attempts to find the optimal optimization scheme for maximal performance while adhering to the power budget constraint. For example, an optimization scheme that would avoid power consumption of a server above 250 watts. When the target metric's optimization attribute is energy with an overall objective of reducing energy, the tuner 115 attempts to find the optimal scheme that achieves the lowest value of energy divided by performance. For example, a scheme achieving the lowest value of Joules per committed instruction. When the target metric's optimization attribute is power, the tuner 115 may attempt to find the optimal scheme that achieves minimal power consumption regardless of performance.

Alternatively, the power optimization attribute can be set with a specific value that should be achieved by the tuner 115. When the target metric's optimization is for performance, the tuner 115 may attempt to find the optimal scheme that achieves highest performance regardless of power or energy consumption. Alternatively, the performance optimization attribute can be set with a specific value that should be achieved by the tuner 115. In other embodiments, other target metrics can be defined such as energy delay or energy delay squared. In yet other embodiments, the goal can be set to minimize the maximum response delay of a web server.

It should be noted that, in certain embodiments, the tuner 115 may be executable code residing in the memory 112 and executed by the processing system 111. In a further embodiment, the tuner 115 can be realized as a service supported by an OS (not shown) of a server 110. In one embodiment, the tuner 115 can be realized as a service or a process of a hypervisor (not shown) of the server 110. In yet another embodiment, the tuner 115 can be realized as a VM or a software container executed and controlled by such hypervisor. The tuner 115 or parts of the tuner 115 may be implemented in a special-purpose core, in firmware, in microcode, or in hardware.

Figure 2:
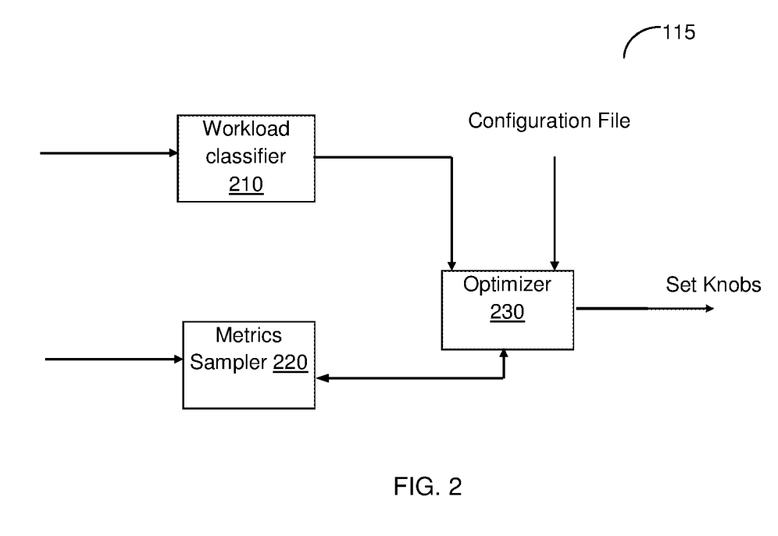
FIG. 2 is a block diagram of a tuner according to an embodiment.

FIG. 2 shows an example block diagram illustrating the operation of the tuner 115 according to one embodiment. As shown in FIG. 2, the tuner 115 includes a workload classifier 210, a metrics sampler 220, and an optimizer 230.

The workload classifier 210 is configured to analyze the workload for each workload type, and to perform locality-based hashing. That is, the workload classifier 210 is configured to characterize the workload into one or more buckets of workloads related to each other. The assumption is that workloads in the same bucket behave similarly with respect to a target metric. To this end, the workload classifier 210 is configured to map similar workloads to the same bucket. Non-limiting examples for buckets include a number of processes (threads) currently being executed, a number of processes in the system, a CPU usage, an I/O usage, the locality based hashing values, and so on. As noted above, in some embodiments, buckets may be classified in tuning groups.

It should be noted that tuning is performed per workload type. The workload can be estimated using system parameters, thread parameters, or both. Non-limiting examples for system parameters include a number of threads currently executed, a total CPU usage, a number of interrupts per second, and a total number I/O requests per second. Non-limiting examples for thread parameters include, but are not limited to, executable name, the ratio of committed memory instructions out of the total committed instructions, executable time, command line parameters, CPU usage, and I/O usage.

In another embodiment, the classifier 210 is configured to predict the next buckets based on the current estimated workload. The next bucket is a future workload of the server 110 (e.g., in the next 1-5 seconds). In some configurations, the next buckets may be the same as the already classified buckets (i.e., buckets that the estimated workload was classified to).

The metrics sampler 220 is configured to receive data from CPU performance counters, peripheral performance counters, OS metrics, application metrics, external power meters, or any combination thereof, and to compute at least one current metric representing the current performance provided, the energy consumed by the server 110, or both. As noted above, a performance metric may be computed as a function of the committed instructions per second, as the user-generated progress cues, etc. An energy metric is based on the energy consumption as measured or estimated by the performance counters, external power meters, or both, divided by the performance metric. A metric can also be a function of power as defined by the ratio between the energy consumed in a time interval divided by the time interval duration.

The optimizer 230 is configured to receive current metrics from the metrics sampler 220, the bucket or buckets of the current workload from the workload classifier 210, and a set of configuration files. The optimizer 230 is further configured to select or determine an optimal optimization scheme and to apply the optimal optimization scheme, leading to optimization of the power consumption and performance of the server.

The configuration file includes at least a list of knobs that can be configured to optimize the server's operation (hereinafter "knobs list"), and a target metric. Each knob in the knobs list is defined, for example, by a knob ID, a knob name, supported operating system distributions, supported kernel versions, unsupported kernel versions, required kernel patches, knob type (on/off, numerical value, string value), knob dependencies (if any), a script for changing and/or retrieving the respective knob value, a script for detecting the possible values of a knob, a minimum time until a new knob's value is in effect, performance and energy cost of changing the knob value, a recommended value of a knob, and so on. In an embodiment, knobs can be added in real-time, such as storage related knobs when connecting a storage device to a server, or software container-related knobs when spawning a new container. Further, knobs can be removed in real-time, for example, storage-related knobs when a storage device is disconnected or software container-related knobs when a container exits.

A recommended value for each knob may be a numeric value, a binary value, or a function. For example, the recommended value may be a choice of 10 schedulers for the OS, a limit on the number of file handles, a limit on selection of sockets for a TCP connection, a time out window for a TCP connection, a minimum time limit period before a process may migrate, a memory page size, whether to enable symmetric multithreading, whether to enable cache partitioning and how, which choice of hardware prefetching to use, choice of CPU microcode version, choice of power management unit firmware, and so on.

In an embodiment, the configuration file includes a list of optimization schemes that are known to optimize certain workload buckets. Each such optimization scheme indicates a bucket that the scheme can improve, the IDs and values of knobs that should be modified when applying the scheme, and a target metric that the optimization scheme can fulfill. Each target metric included in the configuration file may determine the desired or targeted performance, power consumption, or both, to achieve. The list of optimization schemes may include optimization schemes that have been tried on different servers than the server currently being tuned. Thus, when operating in a data center optimization schemes can be shared across servers operable in a data centers. In an embodiment, the configuration file is updated with newly discovered buckets and optimization schemes so that the configuration file will be available in subsequent runs of optimizer 230.

The optimizer 230 is configured to determine or select (from the list of optimization schemes) an optimization scheme that would tune the server to meet the target metric based on the received bucket and current metric. In an embodiment, the optimizer 230 traverses the optimization scheme database to check if there is a scheme that can be applied. If so, the scheme is selected and the knobs (designated by knob IDs) are modified to their respective values as defined in the scheme.

In one embodiment, the performance and cost of changing knobs' values is considered and compared to the benefits estimated by applying the optimization scheme. For example, the cost may be quantified as a time for the new value of the knob to be in effect, a performance degradation, an energy cost, or any other type of cost. If the benefits outweigh the costs, the optimization scheme is applied. Otherwise, the optimizer 230 is configured to search for an alternative optimization scheme. If no alternative scheme is found, the knobs' values remain unchanged.

In another embodiment, when the benefits outweigh the costs, the optimization scheme is applied. Otherwise, the optimizer 230 is configured to apply only a subset of the optimization scheme so that the cost would justify the benefits offered by applying the full optimization scheme. In yet another embodiment, the optimizer 230 is configured to select the optimization scheme which can offer the greatest benefits in the next time interval less the costs of changing the knobs. If the best scheme's benefits do not outweigh the costs, only a subset of the knobs are altered so that the benefits outweigh the costs.

If there is no scheme that can be reused, the optimizer 230 is configured to tune the knobs until the target metric is reached or otherwise optimized. In a non-limiting embodiment, the tuning includes iteratively setting a subset of knobs to temporary values until the target metric is optimized. At each iteration, the current metric is estimated and compared with the best previously found target metric for the current bucket. If the target metric is improved, the current knob IDs and their values are saved to a new optimization scheme together with the bucket and the achieved target metric value.

In an embodiment, only current metrics that demonstrate a significant improvement (e.g., an improvement above a predetermined threshold) or when two or more subsequent buckets are the same, such metrics are saved. In yet another embodiment, the average of the metrics measured in more than one iteration of the set of knobs and their respective values will be used to estimate the target metric. In yet another embodiment, the minimum or maximum of the metrics measured in more than one iteration of the set of knobs and their respective values will be used to estimate the target metric.

It should be noted that, at each iteration, a different set of values can be applied, a different subset of knobs can be tested, or both. A subset of knobs may include a single knob, some of the knobs, or all knobs from the list of knobs. It should be noted that the attempt to tune the knobs to meet the target may be stopped after a predefined number of iterations, and the best scheme found is saved as the optimal scheme for the bucket.

It should be further noted that, in one embodiment, the tuner 115 continuously measures performance and power. If the results deviate from the expected results by at least a predetermined threshold, the tuner 115 is configured to split a bucket into two or more buckets and to reset the knob values, thereby resulting in recalibration of the knobs in all new buckets. In an embodiment, the tuner 115 is configured to search for clusters of workloads within buckets, using, for example, the k-means clustering algorithm, in order to determine whether a bucket should be split. In another embodiment, a decision tree is used for this purpose.

Following is an example for the operation of the tuner 115. A program being executed on a server behaves consistently and takes a very long time to finish. After launching the program, the tuner 115 is executed. As the tuner 115 begins its operation for the first time there is only one bucket, and the mapping function maps everything to that one bucket regardless of the workload. At first, the tuner 115 attempts to set the IO scheduling knob to "CFQ scheduling" and estimate performance and power metrics. For example, 10 B committed instructions in 10 seconds are estimated for the current performance metric (1 B committed instructions per second) and 2 kJ in 10 seconds for the current power metric (200 Watts). Then, the tuner 115 sets the IO scheduling knob to "NOOP scheduling". As a result, the estimated performance and power metrics would be 11 B committed instructions in 10.8 seconds (1.02 B committed instructions per second) and 2.18 kJ of energy in 10.8 seconds (202 Watts), respectively. Therefore, if the target metric is performance, then "NOOP scheduling" will be used, as it demonstrates improvement in the number of committed instructions per second. Alternatively, when the target metric is power consumption, "CFQ scheduling" will be utilized, as it demonstrates reduction in the power consumption. If the target metric is energy, then "NOOP scheduling" will be used, as it demonstrates lower energy per committed instruction (198 nJ Vs. 200 nJ).

It should be noted that that some or all of the elements of the tuner 115 can be realized in software, firmware, hardware, or any combination thereof. When realized in hardware, any of the elements can be implemented by a processing system. Examples for a processing system are provided above. When realized in software, the tuner 115 can be implemented as a service supported by an OS (not shown) of a server 110; a service or a process of a hypervisor (not shown) of the server 110; or a VM (or software container) executed and controlled by such hypervisor. It should also be noted that tuner 115 may be executed inside a container or a VM.

Figure 3:
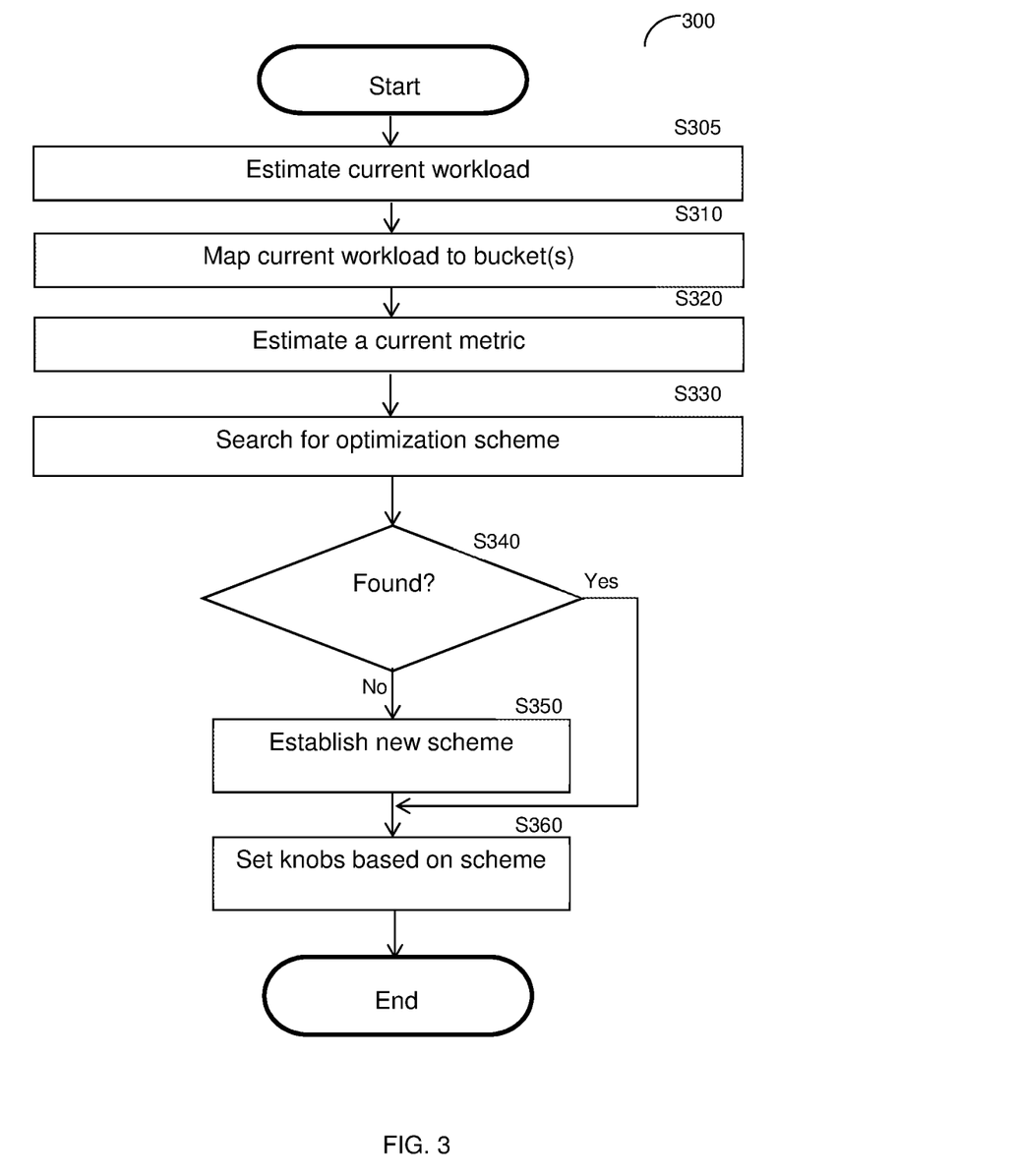
FIG. 3 is a flowchart illustrating a method for optimizing the power consumption and performance of a computing server according to an embodiment.

FIG. 3 is an example flowchart 300 illustrating a method for optimizing the operation of a server according to an embodiment. The operation optimization may include optimizing a power consumption, performance, or both. The method is discussed with a reference to a single server, but can be applicable to any number of servers that may be operable, for example, in a datacenter.

At S305, the method begins when a current workload of the server is retrieved or otherwise estimated. The workload may account for the applications, system processes, or both, each with one or more threads, which run on the server. The workload may include different types of workload metrics typically not related to a specific hardware resource.

At S310, the current workload of the server is mapped to at least one bucket. In an embodiment, the mapping is performed using a locality based hash function applied on workload-related values. At S320, a current metric related to performance, power consumption, or both, is measured. It should be noted that S310 and S320 can be performed concurrently or in a different order.

At S330, the list of optimization schemes is searched to find an optimization scheme that is optimal for each of the buckets. A matching (or optimal) scheme is a scheme that, when applied, would result in meeting or improving over a target metric goal.

At S340, it is checked if such an optimal optimization scheme was found and, if so, execution continues with S360. Otherwise, execution continues with S350, where an attempt to establish an optimization scheme that would improve the current metric is made. Various embodiments for establishing an improving optimization scheme are discussed in greater detail herein below with respect to FIGS. 4 and 5.

At S360, the subset of knobs is set based on a selected optimization scheme. The selected optimization scheme may be either the scheme found at S340 established (created) at S350. That is, when an optimal optimization scheme was found, the optimal optimization scheme may be used. Otherwise, the best scheme found may be utilized as the optimization scheme. The best scheme may be the scheme that comes closest to meeting a target value or range of values, or it may be a scheme that was created to test system performance under new knob settings.

It should be noted that the process discussed above can be repeated when a new metric is provided. Further, this process can be performed independently for each bucket of workloads. In an embodiment, this process can be performed independently for each group of buckets associated with a tuning group.

Figure 4:
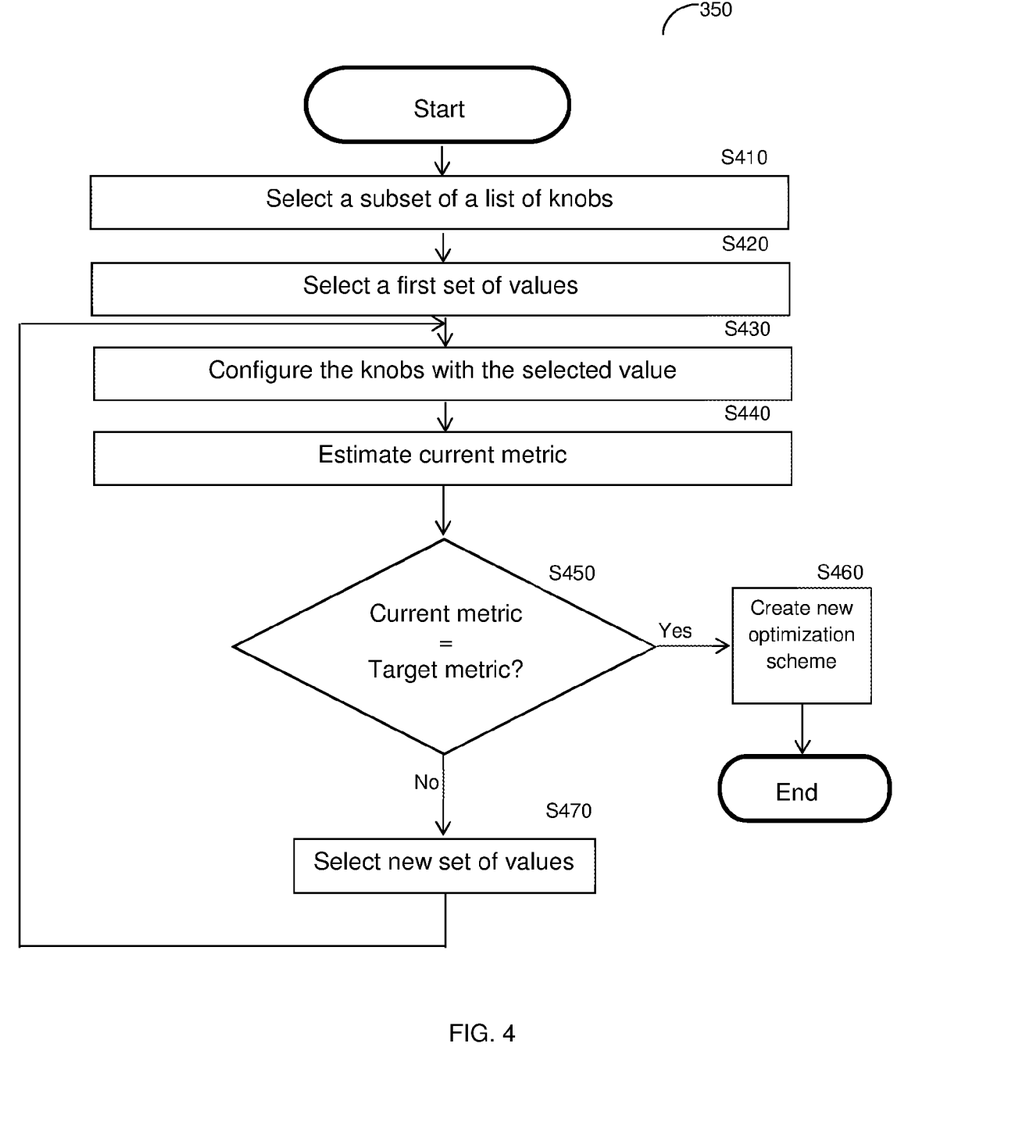
FIG. 4 is a flowchart illustrating a method for establishing a new optimization scheme according to one embodiment.

FIG. 4 shows an example flowchart illustrating the operation of S350 in greater detail. In this embodiment, an attempt is made to establish an optimization scheme to a target metric defined using one or more optimization attributes having a specific value or a range of values.

At S410, a subset of knobs from the list of knobs are selected. The subset of knobs may include one, some, or all of the knobs designated in the list. At S420, a first set of values is selected for the subset of knobs. The values may be selected from a set of recommended values.

At S430, each of the subset of knobs is configured with its respective value. This results in a change in the metrics of the server. At S440, a current metric is measured, estimated, or a combination thereof, to result with an "estimated metric." In an embodiment, the current metric is measured or estimated after the server has run for a predefined time interval. The estimated metric can be saved for future use. At S450, the estimated metric is compared with each optimization attribute's value defined in the target metric to determine if the compared metrics are matching and, if so, execution continues with S460; otherwise, execution continues with S470. For example, if the target metric defines a performance optimization attribute having a value of 1.1 B committed instructions per second and the current performance estimated metric is 1 B committed instructions per second, then the metrics are not considered to be matched.

If S450 results with a yes answer, at S460, a new optimization scheme is created with the subset of knobs and their respective values. If S450, results with a no answer, at S470, a new set of values is selected, from the list of recommend values, for the subset knobs and execution returns to S430. Execution ends when either the target metric goal is met or after a predefined number of iterations. In an embodiment, if the process could not establish a target metric having a specific value of an optimization attribute, an attempt may be made to achieve an overall optimization relative to the current estimated metric (for example, lower power consumption).

Figure 5:
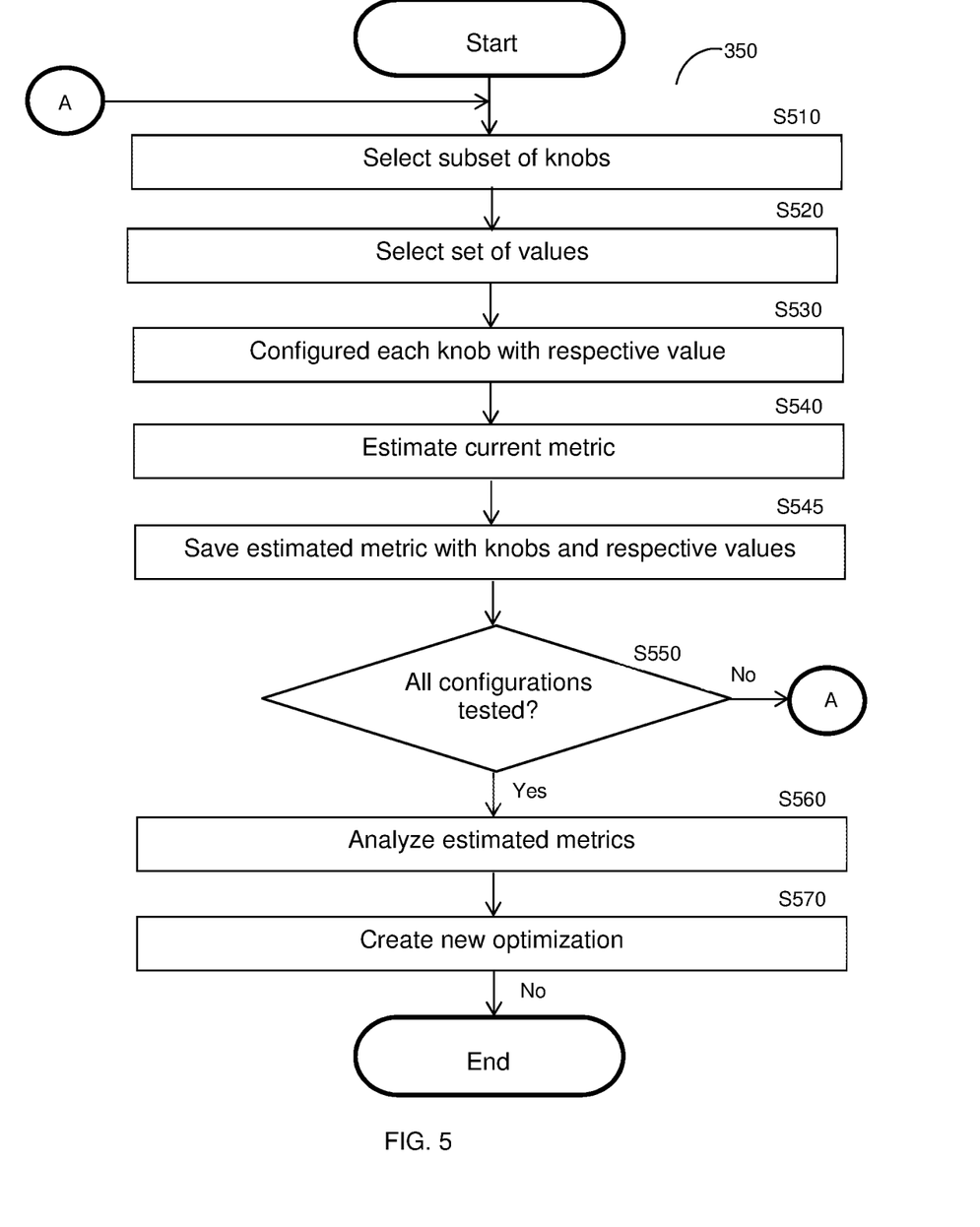
FIG. 5 is a flowchart illustrating a method for establishing a new optimization scheme according to another embodiment.

FIG. 5 shows an example flowchart illustrating the operation of S350 in greater detail. In this embodiment, an attempt is made to establish an optimization scheme to a target metric defined with an overall objective as opposed to a specific value.

At S510, a subset of knobs from the list of knobs is selected. The subset of knobs may include one, some, or all of the knobs designated in the list. At S520, a set of values is selected for the subset of knobs.

At S530, each of the subset of knobs is configured with its respective value. This results in a change in the metrics of the server. At S540, a current metric is measured, estimated, or a combination thereof, to result with an "estimated metric." In an embodiment, the current metric is measured or estimated after the server has run for a predefined time interval. It should be noted that during this interval the workload can change and the associated bucket and/or tuning group may be different, in which case the process described herein continues in the context of the newly detected bucket and/or tuning group.

At S545, the estimated metric is saved together with the knobs and their respective values that have resulted in the current estimated metric. In an embodiment, only estimated metrics of buckets that have appeared at least twice in a row are saved. In another embodiment, only current metrics that demonstrate a significant improvement during the time interval are saved. In yet another embodiment, the average of the metrics measured in more than one run of the set of knobs and their respective values will be used to estimate the target metric. In yet another embodiment, the minimum or maximum of the metrics measured in more than one run of the set of knobs and their respective values will be used to estimate the target metric. In an embodiment, the target metric is estimated by calculating the weighted average of the improvement of the metric across all buckets belonging to the detected tuning group.

At S550, it is checked if all knob configurations have been tested or a maximum number of iterations have been performed. If so, execution continues with S560; otherwise, execution continues with S510 using a new subset of knobs, a new set of values, or both.

In one embodiment, the selection of knobs and values is made to perform an exhaustive search on all possible knob configurations. In another embodiment, one knob is selected and all possible values for that single knob are tested. After all settings for a knob have been tested, the best setting is selected and the next knob is tested. The iteration completes when all knobs have been tested and set. The process ends when the improvement from one iteration is below a threshold or a maximum number of iterations has been reached. In yet another embodiment, knobs are selected based on simulated annealing, reinforcement learning or genetic algorithms. In a further embodiment, machine learning algorithms are utilized to determine which knobs to tune and to which values.

At S560, the estimated metrics from the different knob configurations are analyzed to determine which configuration best satisfies the optimization attribute's objective defined in the target metric. For example, if the optimization attribute's objective is "minimal power consumption", then a configuration demonstrating the lowest power consumption among the analyzed configurations is determined to satisfy the optimization attribute's objective. At S570, a new optimization scheme is created with the knobs and their respective values associated with the estimated metric.

Although various embodiments are described herein with reference to optimizing the performance and power consumption of servers deployed in datacenters, the disclosed embodiments are also applicable to other types of computing systems and infrastructures. The computing systems may include, for example, desktop computers, smartphones, tablet computers, laptop computers, network computer (NetPC), set-top boxes, embedded devices, wearable devices and the like. The computing infrastructure may include, for example, a local area network, a public cloud computing platform, a private cloud computing platform, and so on.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that performs the same function, regardless of structure.

What is claimed is:

1. A method for self-tuning a computing system, comprising:
    mapping a current workload of the computing system to at least one bucket;
    measuring a current operation metric representing a current operation of the computing system; determining, based on the current operation metric, at least one optimization scheme for each of the at least one bucket, wherein the at least one optimization scheme includes at least a list of system knobs having optimal values configured to adjust the operation of the computing device to meet at least one predefined target metric; and
    setting each of the system knobs listed in the at least one determined optimization scheme to its respective value.

2. The method of claim 1, wherein the current operation is of at least one of: performance of the computing system, energy consumption of the computing system, power consumption of the computing system.

3. The method of claim 2, wherein the current operation metric includes at least one of: a performance metric indicating an amount of work performed by the computing system during a certain time period, an energy consumption metric indicating an amount of energy consumed by the computing system during a certain time period, and an average power consumption metric indicating an amount of energy consumed by the computing system per amount of work performed by the computing system during a certain time interval.

4. The method of claim 1, wherein classifying the current workload to the at last one bucket is performed using a locality based hashing function.

5. The method of claim 1, further comprising:
    receiving at least one configuration file including a list of system knobs, wherein the at least one configuration file further includes the at least one predefined target metric.

6. The method of claim 5, wherein each predefined target metric is based on at least one optimization attribute, wherein each of the at least one optimization attribute is any one of: a performance attribute, a power consumption attribute, an energy attribute, software generated progress cues, and a network bandwidth attribute.

7. The method of claim 5, wherein each system knob is a configurable parameter, wherein each configurable parameter includes any one of: a hardware configuration parameter, a firmware configuration parameter, an operating system (OS) configuration parameter, and an application configuration parameter.

8. The method of claim 1, further comprising:
    continuously estimating the current workload of the computing system.

9. The method of claim 8, wherein the current workload accounts for at least one of: software applications, system processes, and hardware components of the computing system.

10. The method of claim 8, wherein estimating the current workload further comprising:
    analyzing a plurality of system parameters and thread parameters of the computing system.

11. The method of claim 1, further comprising:
    trying each of the at least one optimization scheme to determine one optimization scheme that best meets the target metric.

12. The method of claim 11, further comprising:
    determining, whether the at least one optimization scheme meets the target metric;
    establishing a new optimization scheme, when it is determined that the at least one optimization scheme does not meet the target metric; and
    tuning the system knobs included in the configuration list based on the new established optimization scheme.

13. The method of claim 12, wherein establishing the new optimization scheme further comprises:
    selecting a first subset of system knobs from the list of system knobs;
    selecting a first set of values for the first subset of system knobs;
    tuning the first subset of system knobs to their respective values of the first set of values;

measuring a new current metric;
comparing the new current metric to the target metric; and
creating a new optimization scheme to define the first set of system knobs and their respective first set of values, when the new current metric is substantially the same as the target metric.

14. The method of claim 13, further comprising:
iteratively trying a second subset of system knobs and a second subset of values, when the new current metric is not substantially the same as the target metric.

15. The method of claim 14, further comprising:
for each subset of system knobs and their values that have been tried, creating a temporary scheme including the respective current metric for the subset of system knobs and their values being tried.

16. The method of claim 15, further comprising:
analyzing each of the temporary schemes to identify at least one temporary scheme that best meets the target metric.

17. The method of claim 1, further comprising:
predicting based on the at least one bucket at least one subsequent bucket; and
applying the optimization scheme with respect to the at least one subsequent bucket.

18. The method of claim 1, further comprising:
mapping the at least one bucket to at least one tuning group; and
applying the optimization scheme with respect to each of the at least one tuning group.

19. The method of claim 1, further comprising
tuning the system knobs to their optimal static values based on past-measured workload.

20. A non-transitory computer readable medium having stored thereon instructions for causing a processing circuitry to execute a process for self-tuning of a computing system, the process comprising:
mapping a current workload of the computing system to at least one bucket;
measuring a current operation metric representing a current operation of the computing system; determining, based on the current operation metric, at least one optimization scheme for each of the at least one bucket, wherein the at least one optimization scheme includes at least a list of system knobs having optimal values configured to adjust the operation of the computing device to meet at least one predefined target metric; and
setting each of the system knobs listed in the at least one determined optimization scheme to its respective value.

21. A computing system, comprising:
a processing circuitry; and
a memory, the memory containing instructions that, when executed by the processing circuitry, configure the computing system to:
map a current workload of the computing system to at least one bucket;
measure a current operation metric representing a current operation of the computing system;
determine, based on the current operation metric, at least one optimization scheme for each of the at least one bucket, wherein the at least one optimization scheme includes at least a list of system knobs having optimal values configured to adjust the operation of the computing device to meet at least one predefined target metric; and
set each of the system knobs listed in the at least one determined optimization scheme to its respective value.

22. The system of claim 21, wherein the current operation is of at least one of: performance of the computing system, energy consumption of the computing system, power consumption of the computing system.

23. The system of claim 22, wherein the current operation metric includes at least one of: a performance metric indicating an amount of work performed by the computing system during a certain time period, an energy consumption metric indicating an amount of energy consumed by the computing system during a certain time period, and an average power consumption metric indicating an amount of energy consumed by the computing system per amount of work performed by the computing system during a certain time interval.

24. The system of claim 21, wherein classifying the current workload to the at last one bucket is performed using a locality based hashing function.

25. The system of claim 21, wherein the system is further configured to:
receive at least one configuration file including a list of system knobs, wherein the at least one configuration file further includes the at least one predefined target metric.

26. The system of claim 25, wherein each predefined target metric is based on at least one optimization attribute, wherein each of the at least one optimization attribute is any one of: a performance attribute, a power consumption attribute, an energy attribute, software generated progress cues, and a network bandwidth attribute.

27. The system of claim 25, wherein each system knob is a configurable parameter, wherein each configurable parameter includes any one of: a hardware configuration parameter, a firmware configuration parameter, an operating system (OS) configuration parameter, and an application configuration parameter.

28. The system of claim 21, wherein the system is further configured to:
continuously estimating the current workload of the computing system.

29. The system of claim 28, wherein the current workload accounts for at least one of: software applications, system processes, and hardware components of the computing system.

30. The system of claim 28, wherein the system is further configured to:
analyze a plurality of system parameters and thread parameters of the computing system.

31. The system of claim 21, wherein the system is further configured to:
try each of the at least one optimization scheme to determine one optimization scheme that best meets the target metric.

32. The system of claim 31, wherein the system is further configured to:
determine, whether the at least one optimization scheme meets the target metric;
establish a new optimization scheme, when it is determined that the at least one optimization scheme does not meet the target metric; and
tune the system knobs included in the configuration list based on the new established optimization scheme.

33. The system of claim 32, wherein the system is further configured to:
select a first subset of system knobs from the list of system knobs;
select a first set of values for the first subset of system knobs;

tune the first subset of system knobs to their respective values of the first set of values;
measure a new current metric;
compare the new current metric to the target metric; and
create a new optimization scheme to define the first set of system knobs and their respective first set of values, when the new current metric is substantially the same as the target metric.

34. The system of claim 33, wherein the system is further configured to:
iteratively try a second subset of system knobs and a second subset of values, when the new current metric is not substantially the same as the target metric.

35. The system of claim 34, wherein the system is further configured to:
for each subset of system knobs and their values that have been tried, create a temporary scheme including the respective current metric for the subset of system knobs and their values being tried.

36. The system of claim 35, wherein the system is further configured to:
analyze each of the temporary schemes to identify at least one temporary scheme that best meets the target metric.

37. The system of claim 21, wherein the system is further configured to:
predict based on the at least one bucket at least one subsequent bucket; and
apply the optimization scheme with respect to the at least one subsequent bucket.

38. The system of claim 21, wherein the system is further configured to:
map the at least one bucket to at least one tuning group; and
apply the optimization scheme with respect to each of the at least one tuning group.

39. The system of claim 21, wherein the system is further configured to:
tune the system knobs to their optimal static values based on past-measured workload.

* * * * *